United States Patent
Young et al.

(10) Patent No.: US 11,794,097 B2
(45) Date of Patent: Oct. 24, 2023

(54) VIDEO GAME CONTROLLER WITH AUDIO CONTROL

(71) Applicant: Voyetra Turtle Beach Inc., White Plains, NY (US)

(72) Inventors: Andrew Brian Young, Wales (GB); Stephen Thomas Bright, Wales (GB)

(73) Assignee: Voyetra Turtle Beach, Inc., White Plains, NY (US)

(*) Notice: Subject to any disclaimer, the term of this patent is extended or adjusted under 35 U.S.C. 154(b) by 0 days.

(21) Appl. No.: 17/477,342

(22) Filed: Sep. 16, 2021

(65) Prior Publication Data
US 2023/0084944 A1    Mar. 16, 2023

(51) Int. Cl.
*A63F 13/22* (2014.01)
*A63F 13/215* (2014.01)
*A63F 13/235* (2014.01)
*A63F 13/26* (2014.01)

(52) U.S. Cl.
CPC ............ *A63F 13/22* (2014.09); *A63F 13/215* (2014.09); *A63F 13/235* (2014.09); *A63F 13/26* (2014.09)

(58) Field of Classification Search
CPC ......... A63F 13/22; A63F 13/215; A63F 13/26
See application file for complete search history.

(56) References Cited

U.S. PATENT DOCUMENTS

| | | | |
|---|---|---|---|
| 8,529,356 B2* | 9/2013 | Soelberg | A63F 13/87 463/40 |
| 10,143,921 B1* | 12/2018 | Strahle | A63F 13/98 |
| 10,335,674 B1* | 7/2019 | Trenado | G06F 3/023 |
| 11,547,932 B2 | 1/2023 | Lea | |
| 2006/0205505 A1* | 9/2006 | Hussaini | A63F 13/87 463/36 |
| 2007/0202950 A1* | 8/2007 | Hussaini | A63F 13/215 463/39 |
| 2008/0232605 A1* | 9/2008 | Bagha | A61B 7/04 381/67 |
| 2010/0040240 A1* | 2/2010 | Bonanno | H04S 1/005 381/74 |
| 2011/0093157 A1* | 4/2011 | Prabhakaran | G07C 5/006 701/29.5 |
| 2017/0195815 A1* | 7/2017 | Christoph | H04S 7/301 |
| 2017/0372697 A1* | 12/2017 | Cheatham, III | H04L 65/403 |
| 2018/0267771 A1* | 9/2018 | Wiggemans | A63F 13/235 |

OTHER PUBLICATIONS

Int'l Search Report and Written Opinion Appln No. PCT/US2022/043774 dated Nov. 28, 2022.

* cited by examiner

*Primary Examiner* — Dmitry Suhol
*Assistant Examiner* — Carl V Larsen
(74) *Attorney, Agent, or Firm* — McAndrews, Held & Malloy, Ltd.

(57) ABSTRACT

This disclosure describes a system that allows a user to control the audio of a headset from a game controller. Audio controls are displayed on a screen of the game controller. In addition to the game controller, the disclosed system may comprise an app, on a device external from the game controller, that is also able to display the audio controls. The audio controls may be updated via the game controller or the app while the game controller and headset are being used.

17 Claims, 3 Drawing Sheets

VIDEO GAME CONTROLLER WITH AUDIO CONTROL

BACKGROUND

Limitations and disadvantages of conventional game controllers will become apparent to one of skill in the art, through comparison of such game controllers with some aspects of the present system set forth in the remainder of this disclosure with reference to the drawings.

BRIEF SUMMARY

A video game controller with audio control is provided substantially as illustrated by and/or described in connection with at least one of the figures, as set forth more completely in the claims.

DETAILED DESCRIPTION

This disclosure describes a game controller system that allows a user to access and adapt the features of a game controller as well as secondary actions associated with the gaming experience. The disclosed game controller system may comprise a mobile application (app), on a device external from the game controller, that is operable to adjust settings and profiles of the game controller. These settings and profiles are viewable, by the user, from a screen on the game controller.

Certain embodiments of the disclosure may be found in a game controller with a user interface. In accordance with various embodiments of the disclosure, a device, such as a smartphone or tablet, may control settings and profiles, used by the game controller, that may be displayed on the user interface of the game controller. The device may adapt and adjust the settings and profiles even while the game controller is being actively used during a game. The device may communicate with the game controller wirelessly via Bluetooth, Wi-Fi, or any other wireless protocol. The game controller, disclosed herein, is not platform-specific and may communicate with a game console wired or wirelessly via Bluetooth, Wi-Fi, or any other wireless protocol.

The disclosed game controller system offers responsive and reliable controls that improve a user's audio control. In addition, the disclosed game controller system also delivers innovative applications of technology that improve a user's experience.

Figure 1:
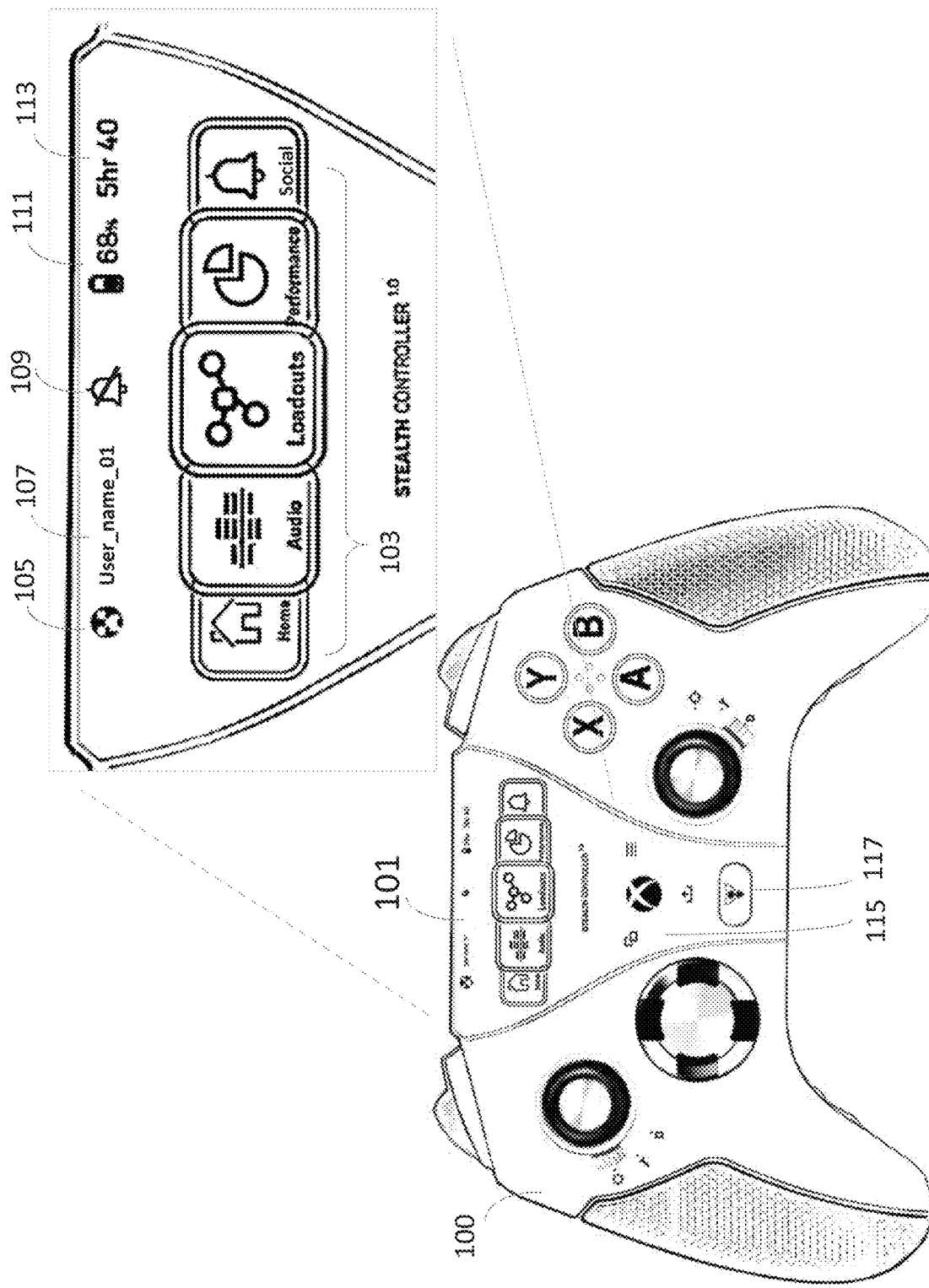
FIG. 1 illustrates an exemplary video game controller with a graphical user interface displaying a menu in accordance with aspects of this disclosure.

FIG. 1 illustrates an exemplary video game controller 100 with a graphical user interface 101 displaying a menu. The game controller 100 is configured to operate a video game and also comprises a memory, a processor and a screen 101. The memory in the game controller 100 is configured to store data associated with the game controller 100. The processor in the game controller 100 is configured to access the memory. The screen 101 is operably coupled to the processor and is configured to display the data to the user of the game controller 100. The game controller 100 may comprise a wireless interface that is operable to communicate directly with a video game console. A dongle may be plugged into the video game console to allow the wireless communication. For example, a USB connection on the video game console may be adapted, via the dongle, to communicate with the game controller 100 via Bluetooth, Wi-Fi or any other wireless protocol.

The screen 101 is integrated into the game controller 100. The screen 101 may comprise a graphical user interface and a touch screen. For example, the screen 101 may comprise a capacitive touch display. The screen 101 may also comprise a high resolution display with deep blacks and rich color. The screen 101 may be covered by a tempered glass that may be configured with smooth 3D curves on the edges.

The screen 101 may display programmable settings, profiles, and/or metrics. What and how elements are displayed is adjustable, via the processor, even while the game controller 100 is in use. The display on the screen 101 may provide a quick, in-game access to the settings, profiles, and/or metrics. The game controller 100 may comprises one or more buttons 117 for controlling what is displayed on the screen 101. The game controller 100 may also comprises one or more backlit controls 115.

The graphical user interface 101 in FIG. 1 illustrates a menu of core features 103, a user icon 105, user name 107, a communication setting 109, a battery charge level 111, and an estimate time 113 until a battery must be recharged. This menu is a user-customizable dashboard that can be designed and redesigned by a user as desired for easy access to most frequently used features and to provide an overview of the controller 100 status. For example, an intuitive user interface may allow a user to quickly and easily change settings as desired.

Because the screen 101 is operable to display a customizable, user interface, the user interface may be configured to indicate primary features of the game controller and secondary features/actions of the game experience. The menu carousel 103 may be selectable by touch or the core feature set hubs may be accessed using the button 117. As illustrated in FIG. 1, the core hubs may comprise Home, Loadouts, Audio, Audio control and Social. The Audio Control hub may comprise details on how secondary features in a headset are being controlled.

The user icon 105 and user name 107 may be selectable according to who is using the game controller 100 at any given time. The communication setting 109 may toggle between allowing and blocking communication via social media and other communication devices. The processor in the game controller 100 may be operable to control communication from an external device.

The game controller 100 may comprise a rechargeable battery. The battery charge level 111 and the estimate time 113 until a battery must be recharged are useful for indicating when a battery needs to be swapped or recharged. Recharging may be performed via a cable or a dedicated cradle.

Figure 2:
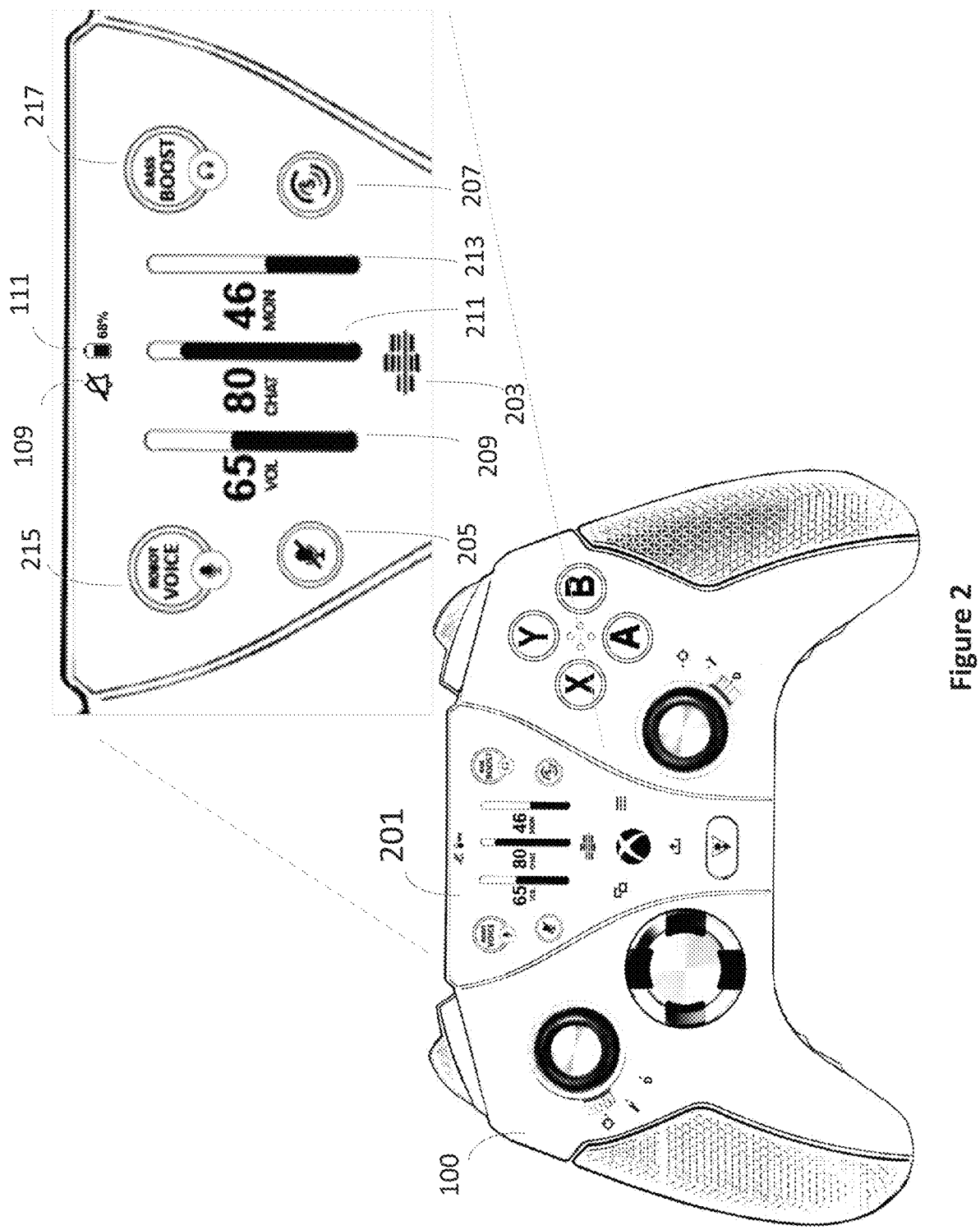
FIG. 2 illustrates an exemplary video game controller with a graphical user interface displaying an audio control screen in accordance with aspects of this disclosure.

FIG. 2 illustrates an exemplary video game controller 100 with a graphical user interface displaying an audio control screen 201 that is also identified via the audio control icon 203.

Audio control screen 201 as illustrated comprises a mute/unmute toggle button 205, a Superhuman Hearing® enable/disable toggle button 207, a game volume slider 209, a chat volume slider 211, a mic monitor volume slider 209, a selector for altering a user's microphone output 215 and a selector for altering a user's headphone output 217.

The game volume slider 209, chat volume slider 211 and mic monitor volume slider 209 provide full access to a game platform's audio controls for mixing game volume, chat and mic.

The selector for altering a user's microphone output 215 may enable clearer chat to teammates. Alternatively, the selector 215 may be used to disguise a user's voice. For example, a user could choose a preprogrammed robot voice as illustrated.

Audio features may also be programmed and selected for a user's headphone output 217. Equalizer customization may be used to generate a number of profiles. These profiles may also be game-specific and/or user-specific. Equalizer setting may be linked to a particular loadouts so that an audio experience changes dynamically depending on the game that a user is playing.

The audio control screen 201 may also comprise the communication setting indicator 109 and the battery charge level indicator 111 as described with reference to the exemplary display 101 in FIG. 1.

Audio control from the game controller 100 may be performed via edge and/or cloud computing. Historic audio response may be displayed to show volume levels over time. Core audio adjustment input may be shown on the screen. The layout of such audio adjustment input may be designed, controlled and revealed via an application that runs on the game controller 100 and/or via a mobile application (app) that runs on an external device.

Figure 3:
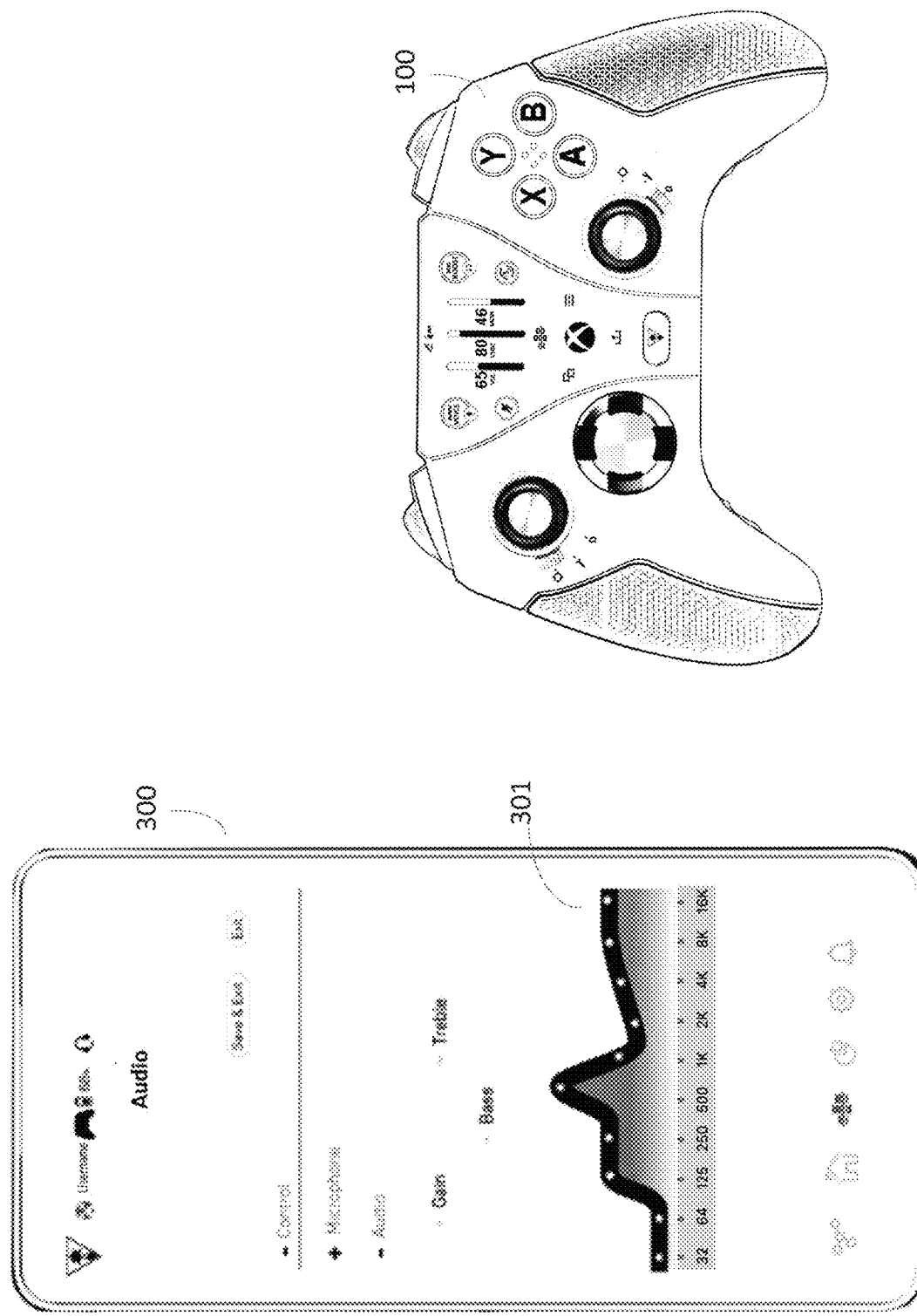
FIG. 3 illustrates an exemplary video game controller and an associated app running on a mobile device in accordance with aspects of this disclosure.

FIG. 3 illustrates an exemplary video game controller 100 and an associated app 300 running on a mobile device. As illustrated, the app 300 on the mobile device is used to configure and dynamically display the audio control screen 201 on the game controller 100.

An app 300 may be configured to operate on a device external from the game controller 100. The app 300 is operable to adjust the data used by the game controller 100 even while the game controller 100 is in use. The device may be, for example, a smartphone or a tablet. The game controller 100 may comprise a wireless interface that is operable to communicate directly with the device. For example, a particular screen layout design can be created on the companion app 300 and sent to onboard memory of the controller 100. The app 300 may also be enabled to access storage of a cloud service provider and be powered by the cloud. The app 300 may provide full access to the game controller 100 to customize and improve audio control.

The companion app 300 may be used to create user-customized equalizer profiles for headphones and/or microphones that may be connected to headphones. Once created, the equalizer profiles may be sent to the controller 100.

As illustrated, the app 300 may be used to create a microphone equalizer profile. An equalizer 301 can be controlled manually per band. Also, an overall gain, bass boost or treble boost may be applied on top of the manual adjustments. Similarly, one or more headphone equalizer profiles may be created and saved in the app 300. Profiles for microphones and headphones may also be downloaded or shared between users.

While the present system has been described with reference to certain implementations, it will be understood by those skilled in the art that various changes may be made and equivalents may be substituted without departing from the scope of the present system. In addition, many modifications may be made to adapt a particular situation or material to the teachings of the present disclosure without departing from its scope. Therefore, it is intended that the present method and/or system not be limited to the particular implementations disclosed, but that the present system will include all implementations falling within the scope of the appended claims.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether audio control of the function is disabled or not enabled (e.g., by a user-configurable setting, factory trim, etc.).

What is claimed is:

1. A system comprising:
 a game controller configured to operate a video game, the game controller comprising:
   a memory configured to store an audio processing setting in the game controller;

a processor configured to access the audio processing setting;

a wireless interface to communicate with a video game console and a device other than the video game console; and a screen, operably coupled to the processor, configured to display the audio processing setting to a user of the game controller, wherein:

the screen comprises a graphical user interface and a touch screen, the graphical user interface is to access to a user-customizable dashboard, the user-customizable dashboard comprises an audio control hub to change the audio processing setting, and the audio processing setting adjusts, via the memory, the processor and the wireless interface, one or more of a video game volume, a chat volume and a microphone volume, the system comprises an application ("app") configured to operate on the device external from the game controller, wherein the app is operable to display the audio processing setting.

2. The system of claim 1, wherein the app is a mobile app and the device is a smartphone.

3. The system of claim 1, wherein the app is a mobile app and the device is a tablet.

4. The system of claim 1, wherein the audio processing setting is updated while the game controller is in use.

5. The system of claim 1, wherein the processor is operable to control an audio signal that is sent to a headset.

6. The system of claim 1, wherein the processor is operable to control an audio signal that is received from a microphone.

7. A method comprising:

communicating, via a wireless interface, with a video game console and a device other than the video game console;

storing an audio processing setting in a memory of the game controller;

accessing, via a processor of the game controller, the audio processing setting stored in the memory;

displaying the audio processing setting on a screen of the game controller;

changing the audio processing setting via an audio control hub of a user-customizable dashboard on a graphical user interface of the screen;

according to the audio processing setting, adjusting, via the memory, the processor and the wireless interface, one or more of a video game volume, a chat volume and a microphone volume; and displaying the audio processing setting via an application ("app") operating on the device external from the game controller.

8. The method of claim 7, wherein the app is a mobile app and the device is a smartphone.

9. The method of claim 7, wherein the app is a mobile app and the device is a tablet.

10. The method of claim 7, wherein the audio processing setting is updated while the game controller is in use.

11. The method of claim 7, wherein the method comprises:

controlling an audio signal via a processor of the game controller, thereby generating a controlled audio signal; and sending the controlled audio signal to a headset.

12. The method of claim 7, wherein the method comprises:

receiving an audio signal from a microphone; and controlling the audio signal via the processor of the game controller.

13. A non-transitory computer-readable medium storing a program, wherein when operated by a processor, the program configures a method comprising:

communicating, via a wireless interface, with a video game console and a mobile device other than the video game console, wherein the mobile device, external to the video game controller, comprises the non-transitory computer-readable medium and the processor;

updating, via an audio control hub of a user-customizable dashboard on a graphical user interface of a screen of the game controller, an audio processing setting that is stored in a video game controller;

according to the audio processing setting, adjusting one or more of a video game volume, a chat volume and a microphone volume; and displaying the audio processing setting on the screen of the game controller.

14. The non-transitory computer-readable medium of claim 13, wherein the video game controller comprises the non-transitory computer-readable medium and the processor.

15. The non-transitory computer-readable medium of claim 13, wherein the mobile device is one of a smartphone and a tablet.

16. The non-transitory computer-readable medium of claim 13, wherein the method comprises:

controlling an audio signal, thereby generating a controlled audio signal; and sending the controlled audio signal to a headset.

17. The non-transitory computer-readable medium of claim 13, wherein the method comprises:

receiving an audio signal from a microphone; and controlling the audio signal.

* * * * *